H. K. WHEELOCK.
RIM FOR VEHICLE WHEELS.
APPLICATION FILED MAY 1, 1913.
1,084,050.
Patented Jan. 13, 1914.
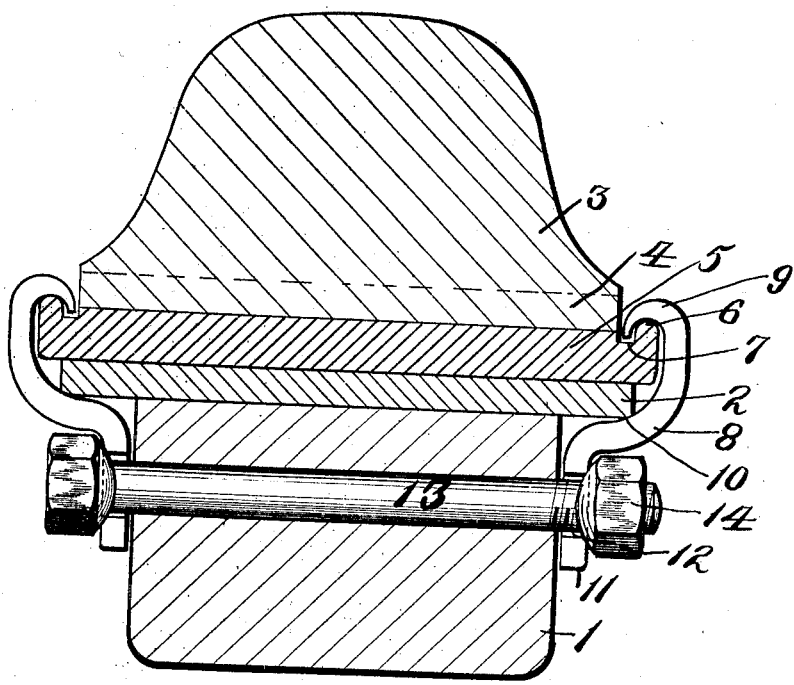
Witnesses
Clyde Hoffman
A. L. McClintock
Inventor
Herbert Kellogg Wheelock
By C. E. Humphrey
Attorney

UNITED STATES PATENT OFFICE.

HERBERT K. WHEELOCK, OF AKRON, OHIO.

RIM FOR VEHICLE-WHEELS.

1,084,050.

Specification of Letters Patent.  Patented Jan. 13, 1914.

Application filed May 1, 1913. Serial No. 764,834.

*To all whom it may concern:*

Be it known that I, HERBERT KELLOGG WHEELOCK, a citizen of the United States, residing at Akron, in the county of Summit and State of Ohio, have invented new and useful Improvements in Rims for Vehicle-Wheels, of which the following is a specification.

This invention relates to improvements in the rim portion of vehicle wheels adapted to hold elastic tires.

The object of the invention is to so construct the rim portion of a vehicle wheel that an elastic tire may be quickly placed thereon and demounted therefrom.

The advantages obtained by this invention are that a tire can be slid laterally onto the outer face or periphery of a vehicle wheel and removed therefrom quickly and with little work and when in place, held securely against movement either circumferential or lateral, the device for holding the tire securely on the periphery of the wheel embodies means for clamping the base or inner face of the tire against the periphery of the wheel.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the claim hereunto appended.

The drawing presented is a transverse sectional view of so much of the rim portion of a vehicle wheel as will illustrate the construction thereof, also showing a tire positioned on the periphery of the wheel, and my improved tire-retaining means in operative connection, both with the wheel and the tire.

Referring more specifically to the drawings the reference numeral 1 denotes the felly of an ordinary vehicle wheel on which may be mounted a felly-band 2 which preferably projects beyond the lateral side faces of the felly 1. Positioned on the outer face of the felly band 2 is a tire 3 the cross sectional configuration of which is immaterial to this invention and which is preferably provided with a hard rubber base 4 which is vulcanized to a ring 5 which may be annular or in the form of a broken ring. I preferably provide the lateral edges of the band 5 with outwardly-projecting beads 6 adjacent to which are circumferentially-extending grooves or channels 7 for a purpose to be later described.

The tire-securing means embodies a pair of broken rings 8 which may be made in the form of half-circles or may be ordinary broken rings. The outer portions 9 of the tire-retaining means are hook-shaped and are arranged to engage the lateral portions of the band 5 and preferably seat on the beads 6. If desired, the inturned edges of the portions 9 may extend into the channels 7. Below the portions 9 of the tire-retaining 7. Below the portions 9 of the tire-retaining means the latter are bent inwardly at 10 and from thence are provided with portions 11 which extend inwardly parallel with the side faces of the felly 1. The portions 11 are provided with a series of large apertures 12 which are arranged to be positioned in registering relation with respect to transverse apertures formed in the felly 1 and also when properly positioned the two rings will be so arranged that the apertures 12 therein and the apertures in the felly 1 will be in transverse alinement with each other. The inner portions 11 of the clamping members 8 are drawn toward each other and toward the side faces of the felly 1 through the medium of bolts 13 provided with nuts 14. The opposing faces of the heads of the bolts and the nuts are preferably convex to engage the walls of the portions 11 surrounding the apertures 12 and the bolts are considerably smaller in diameter than the diameters of the openings 12 so as to allow considerable play or movement of the tire-retaining means 8 with respect to the bolts 13. The laterally-inclined portions 10 of the tire-retaining members 8 are so fashioned as to engage the inner lateral edges of the felly band 2, so that when the members 8 are drawn toward each other as the nuts 14 are drawn up on the threaded shanks of the bolts 13 a wedging action is set up by the engagement of the inclined portions at the points 10 of the members 8 and the fixed inner lateral corner edges of the felly-band 2, the effect of which is to contract the members 8 and tend to draw them inwardly, and as their outer portions engage the lateral portions of the bands 5 the latter is snugly clamped or contracted onto the periphery of the wheel.

I claim:

The combination with a vehicle wheel, of a tire having a metallic inner base rim, an annularly-formed laterally-projecting member secured to said wheel and a broken clamping ring secured to the side of said wheel, the outer portion of which is hook-shaped to engage over the side edge of the metallic base rim, said clamping ring further provided with an inclined portion engaging the side edge of said laterally-projecting member when the former is shifted laterally to set up a wedging action to contract said ring thereby forcing said tire into engagement with the periphery of said wheel, and means engaging said clamping ring and wheel for laterally shifting the former.

In testimony whereof I have hereunto set my hand in presence of two subscribing witnesses.

HERBERT K. WHEELOCK.

Witnesses:
C. E. HUMPHREY.
A. L. McCLINTOCK.